United States Patent [19]
Gentile

[11] Patent Number: 5,139,331
[45] Date of Patent: Aug. 18, 1992

[54] RADIOMETER INCLUDING MEANS FOR ALTERNATELY MEASURING BOTH POWER AND ENERGY WITH ONE PYROELECTRIC DETECTOR

[76] Inventor: John Gentile, 469 Ripley Rd., Frankfort, N.Y. 13340

[21] Appl. No.: 692,945

[22] Filed: Apr. 29, 1991

[51] Int. Cl.⁵ .............................................. G01J 1/04
[52] U.S. Cl. ..................................... 356/218; 356/51; 356/225; 250/338.3
[58] Field of Search ................... 356/43, 218, 225, 51; 250/338.3

[56] References Cited

U.S. PATENT DOCUMENTS 3,459,945  8/1969  Astheimer et al. ............... 250/338.3
4,828,384  5/1989  Plankenhorn et al. ............... 356/121

Primary Examiner—Richard A. Rosenberger
Attorney, Agent, or Firm—Katherine McGuire

[57] ABSTRACT

A pyroelectric detector is provided to measure the energy of pulsed light. To measure the power of continuous wave light (CW light), the pyroelectric detector is releasably attached to optical sampling apparatus which divides the CW light into pulsed light. Means are included to inform processor circuitry in the read-out electronics that the detector is attached to the optical chopper. The processor circuitry then calculates the power of the CW light given the energy of the pulsed light by the pyroelectric detector and the exposure time which is fixed by a crystal clock.

17 Claims, 4 Drawing Sheets

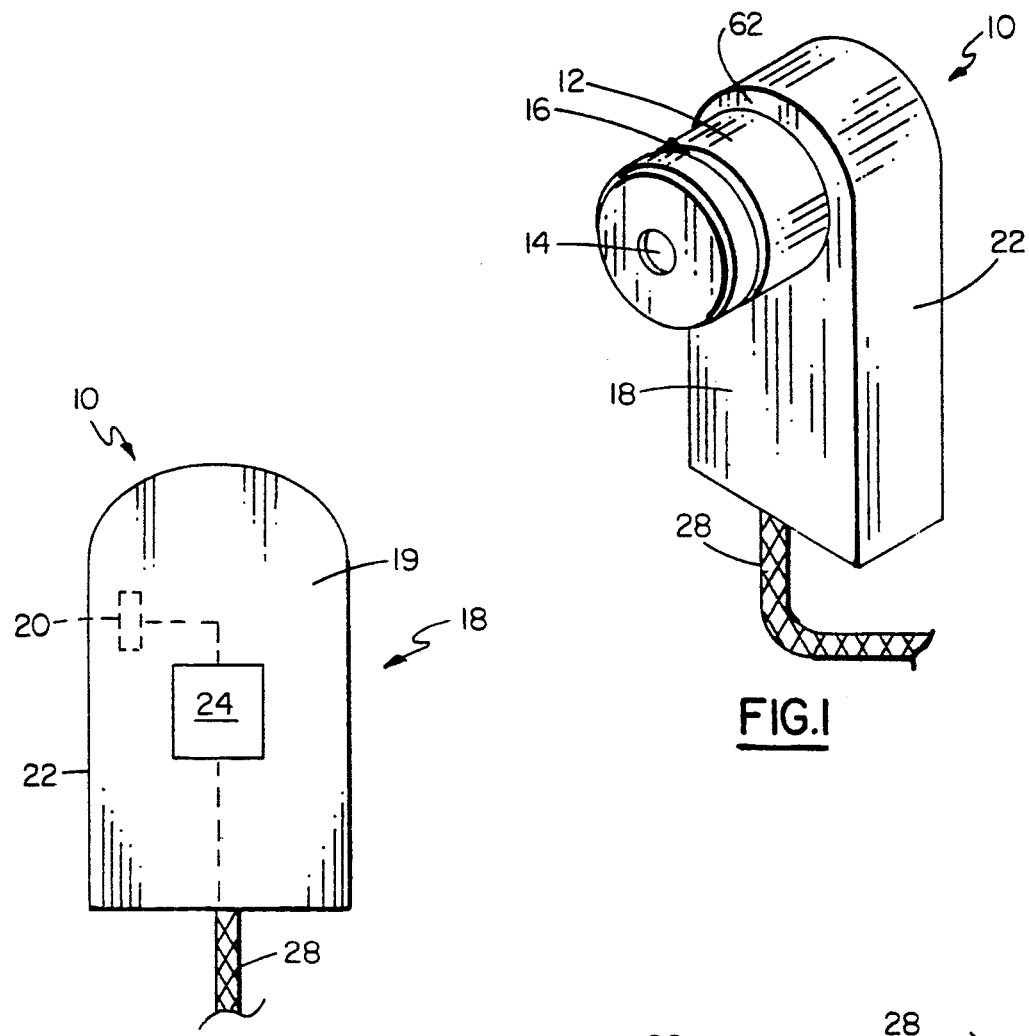
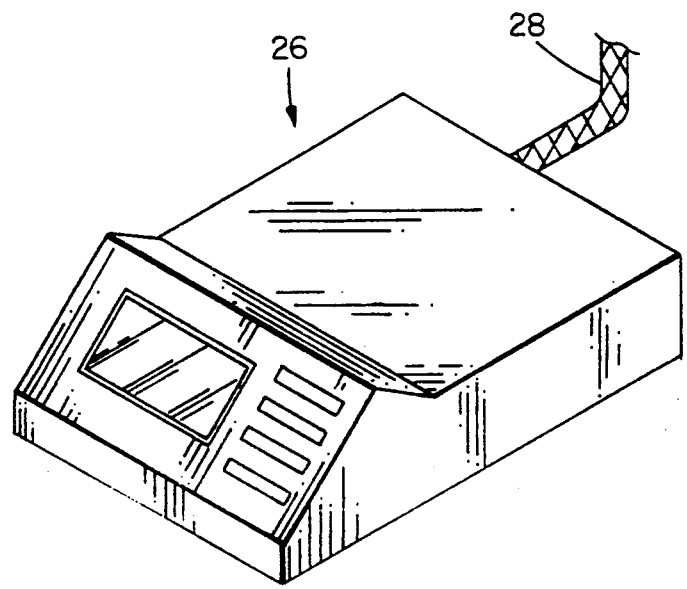

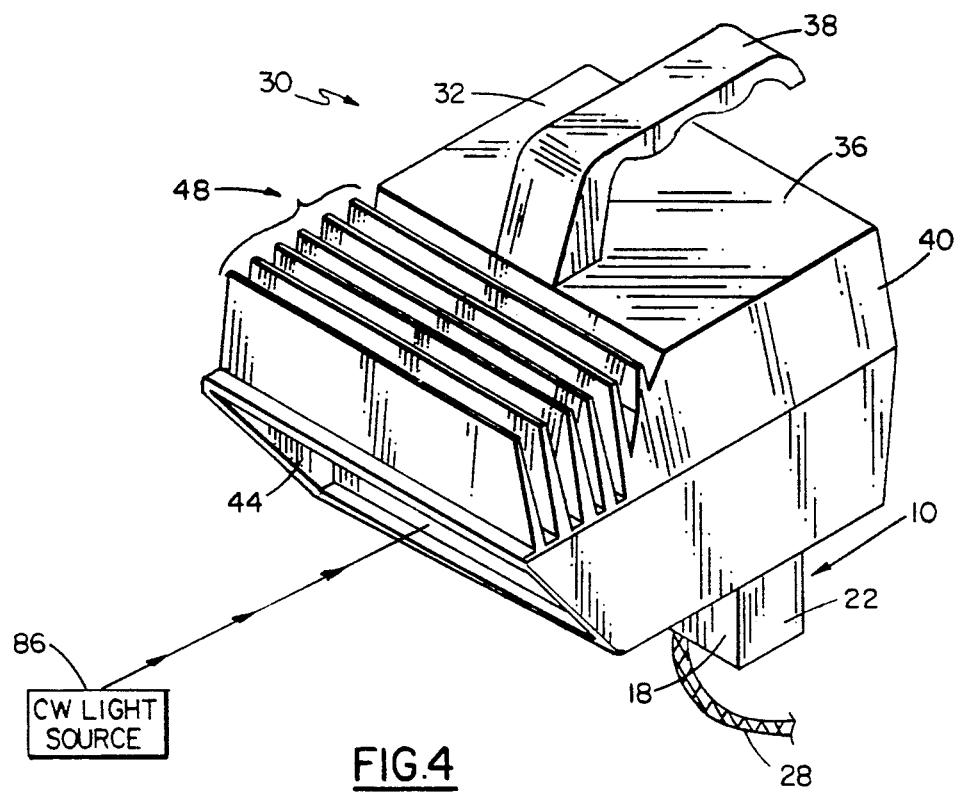
FIG.4
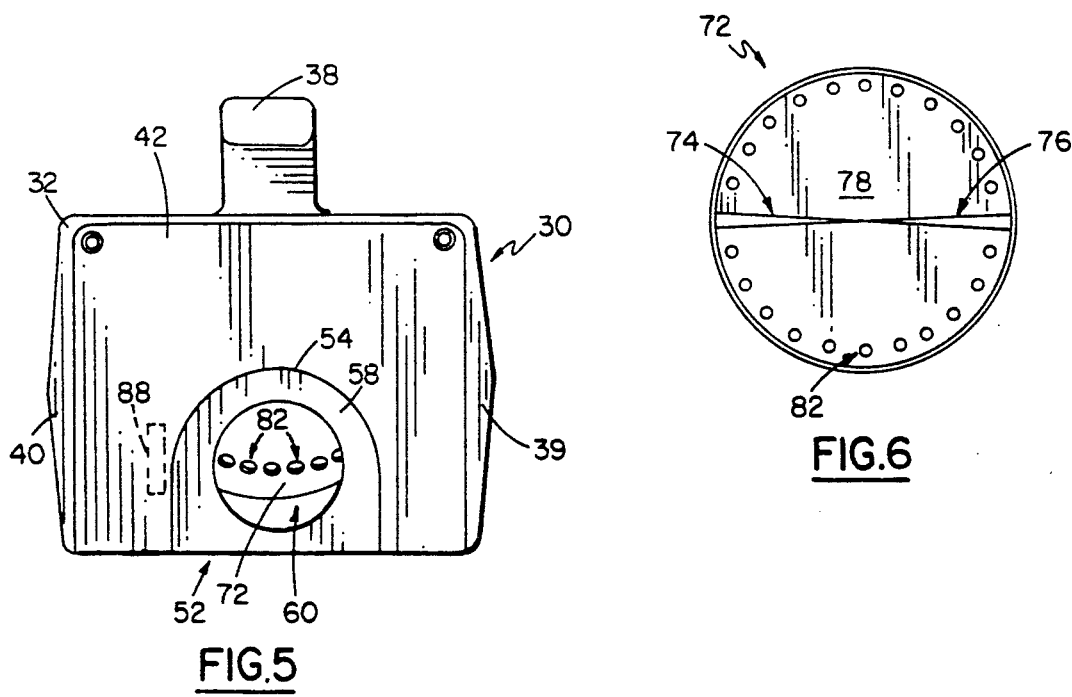
FIG.5
FIG.6

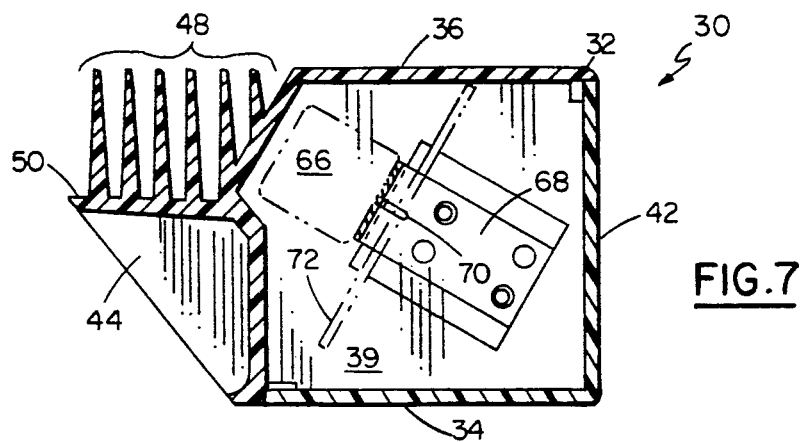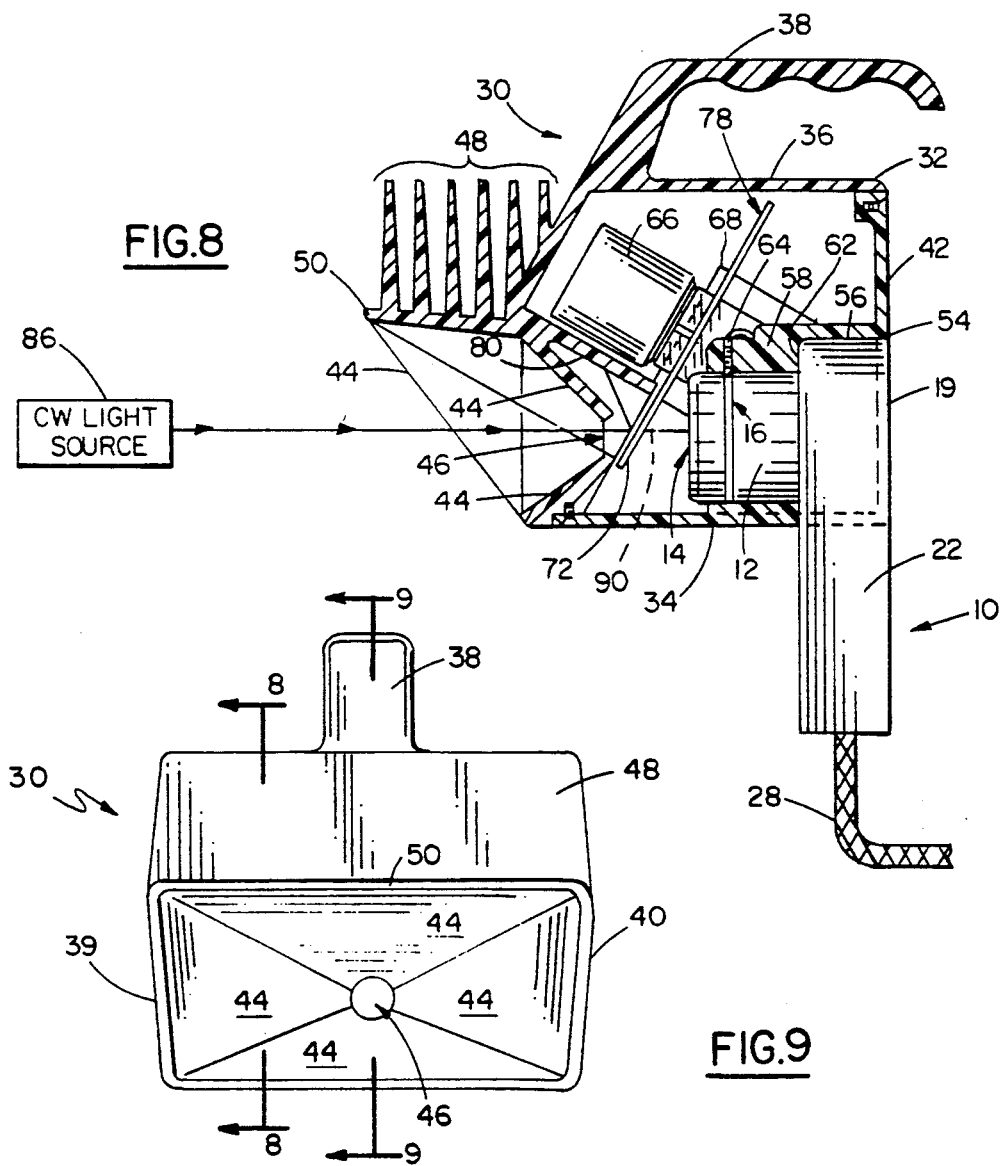

RADIOMETER INCLUDING MEANS FOR ALTERNATELY MEASURING BOTH POWER AND ENERGY WITH ONE PYROELECTRIC DETECTOR

BACKGROUND OF THE INVENTION

This invention relates to radiometers and, more specifically, to a pyroelectric detector which may be releasably attached to optical sampling apparatus such that the same pyroelectric detector may be alternately used for measuring the power of a continuous wave light source and the energy of a pulsed light source.

The science of radiometry is typically concerned with the accurate measurement of the power and energy of optical radiation (e.g., from lasers and other light sources) in terms of the fundamental units of watts and joules, respectively. Radiometry is distinguished from photometry where light intensity is measured, the word "light" referring to the total integrated range of wavelengths to which the human eye is sensitive.

The ideal radiometer is one that can accurately measure optical radiation regardless of its wavelength, duration or magnitude. Several basic detectors can be employed to usefully measure the radiation over certain regions of operation. Coupled with these detector types are a number of signal processing and detection schemes that may be employed, depending on the temporal characteristics of the input radiation. These temporal properties can generally be classified into two categories; pulsed and continuous radiation. For measuring continuous radiation, power is generally the quantity of interest. When the radiation is pulsed, the total energy (optical power integrated over the duration of the pulse) is normally the quantity of interest. Thus two basic types of radiometers exist, power and energy meters.

A basic energy meter in wide use today utilizes pyroelectric detectors which are used to measure the energy of a pulsed light source. The pyroelectric detector is a thermal detector that outputs a current that is proportional to the rate of change of its temperature. The pulse of light to be measured (energy) is absorbed in the black coating of the detector and is thermally and electrically integrated. The resulting electrical step amplitude is then proportional to the optical energy striking the detector. The instrument digitizes this waveform in real time, measures and computes the amplitude of this pulse, displaying the result in terms of joules. The pyroelectric detector is capable of fast response, broad spectral response, and an insensitivity to DC effects. It is widely used in radiometric systems for industrial temperature measuring systems, the detection of light, and in the analysis of lasers, however; it normally cannot handle high average power levels.

A basic power meter in wide use today utilizes the thermopile detector which is a device composed of a plurality of thermocouples connected in series. A voltage is developed in response to temperature differences between the hot and cold junctions. It may be simply viewed of as a weak battery that converts radiant energy into electrical energy. These devices are relatively slow as compared to pyroelectric detectors (typically 1000 times) but can handle higher average power levels and as a result are commonly used to measure the power of a continuous beam of light. For this purpose a DC voltmeter calibrated in terms of watts is normally employed.

Low duty cycle optical choppers have also been used for many years for beam attenuation purposes; however, this has always been used to extend the range of conventional power measurement techniques which, as aforementioned, are inferior in terms of response times and range as compared to the capabilities of the pyroelectric detector.

It is therefore a principal object of the present invention to provide a radiometer comprising a pyroelectric detector in selective combination with optical sampling apparatus whereby the pyroelectric detector may be used by itself to measure the energy of a pulsed light source, or alternatively be operably attached to the optical sampling apparatus to measure the power of a continuous wave light source.

It is another object to provide a power meter in the form of a pyroelectric detector in combination with optical sampling apparatus which is able to withstand power densities exceeding 2.5 KW/cm$^2$, and with greater speed of response and greater dynamic range.

It is a further object to provide a power meter in the form of a pyroelectric detector in combination with optical chopping apparatus which is capable of measuring the power of a continuous wave beam in the range of at least 20 micro-watts to 100 watts in substantially less than a second.

Other objects will in part be obvious and in part appear hereinafter.

SUMMARY OF THE INVENTION

In accordance with the foregoing objects, the invention comprises a novel radiometer which includes a pyroelectric detector for measuring the energy of a pulsed light source, the pyroelectric detector being generally known in the art. It is the general practice in the art to use a thermopile when it is desired to measure the power of a continuous wave light source. There are drawbacks to the operation of the thermopile including slow response times and limited dynamic range. Furthermore, the typical thermopile cannot withstand power densities exceeding 250 W/cm$^2$ which severely restricts its use as a valuable power measuring tool.

The invention under discussion overcomes the above-mentioned drawbacks of the typical thermopile-based power meter by combining the energy measuring pyroelectric detector with optical sampling apparatus. A continuous wave light source, the power of which is desired to be measured, is directed through an optical chopping disc with the pyroelectric detector positioned to receive and measure the energy of the pulses of light impinging thereon, as is its normal function.

Means are provided to inform processor circuitry in the read-out electronics as to which quantity is being measured. The pyroelectric detector and associated circuitry measure energy of pulsed radiation in the usual manner. The power of continuous wave radiation is calculated by circuitry which divides the energy by the exposure time, since energy is the the product of power and exposure time when power is constant for the duration of the exposure time, which it is assumed to be herein. By phase locking the motor speed of the chopping disc to a crystal clock, the exposure time is very precisely determined at 667 micro-seconds.

By designing the optical sampling apparatus so that the pyroelectric detector may be easily and selectively attached thereto, the single pyroelectric detector can be employed for both energy measurement of a pulsed light source (in the unattached condition), and power measurement of a continuous wave light source (in the attached condition). The processor circuitry for measuring power is rendered operative by means of a magnet located in the optical sampling apparatus which closes a magnetic reed switch located in the pyroelectric detector when the latter is attached to the former in the intended manner.

The advantages of this invention compared with conventional thermopile radiometers are as follows:

1. Much higher (at least 10 times) peak power density can be handled without causing damage to the detector. This results from the fact that only 2% of the optical energy goes into heating the detector when using the optical chopping apparatus.

2. Measurements can be made at a much faster rate. The chopping blade rotates at a 30 hz rate and thus measurements can be made in 33 mS. Typical thermopile response times for similar power handling capability are on the order of a second.

3. The dynamic range of the pyroelectric detector is at least five orders of magnitude as opposed to the normal three orders of magnitude that can be obtained with a thermopile. Thus fewer detectors are required to cover a given range of optical radiation levels.

BRIEF DESCRIPTION OF THE DRAWINGS

FIG. 1 is a perspective view of the housing for the energy measuring pyroelectric detector;

FIG. 2 is an elevational view of the back panel of the housing of FIG. 1;

FIG. 3 is a perspective view of the processor and read-out display;

FIG. 4 is a perspective view of the housing of the optical sampling apparatus, also showing a bottom portion of the pyroelectric detector housing of FIG. 1 which is attached to the rear wall of the housing in the manner intended for measuring the power of a continuous wave light beam;

FIG. 5 is a rear, elevational view of the optical sampling apparatus showing the portal for attachment of the pyroelectric detector of FIG. 1 thereto;

FIG. 6 is a plan view of the optical chopping disc of the optical sampling apparatus;

FIG. 7 is an elevational view of the optical sampling apparatus in vertical cross-section as taken along the line 7—7 in FIG. 9;

FIG. 8 is the view of FIG. 7 as taken along the line 8—8 in FIG. 9;

FIG. 9 is a front elevational view of the housing of the optical sampling apparatus;

DETAILED DESCRIPTION

Figure 10:
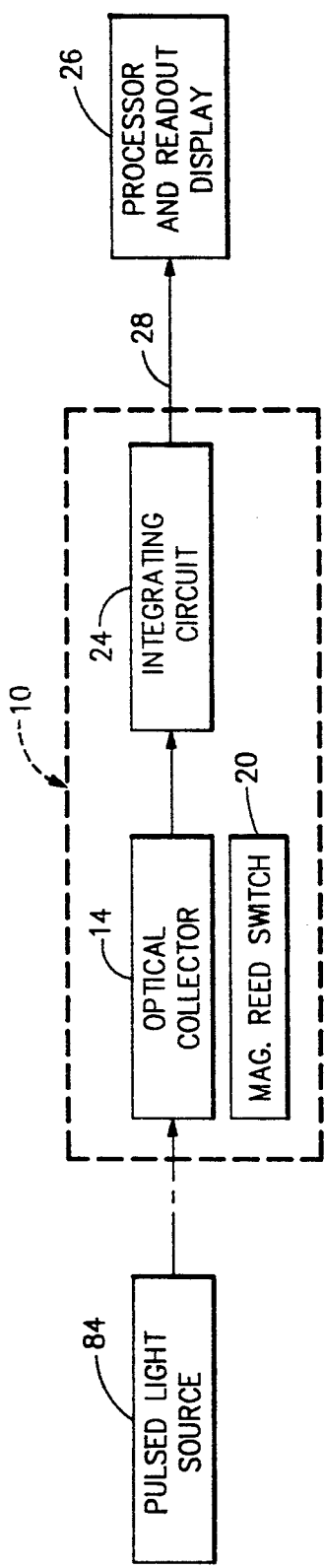
FIG. 10 is a block diagram illustrating the basic operation of the pyroelectric detector as it is used to measure the energy of a pulsed light source.

Referring now to the drawings, there is seen in FIG. 1 a pyroelectric detector designated generally by the reference numeral 10 used to measure the energy of a pulsed light source such as a pulsed laser, for example. Pyroelectric detector 10 is seen to include a cylindrical nose portion 12 having a centrally located, optical collecting component 14 which outputs a current proportional to its rate of change of temperature in the conventional operation of pyroelectric detecting devices. An annular groove 16 encircles the periphery of nose 12 for securing pyroelectric detector 10 to the optical sampling apparatus to be described.

The larger, main body portion 18 of detector 10 houses internal elements seen generally in dotted outline in the rear view of FIG. 2. A magnetic reed switch 20 is seen positioned adjacent side wall 22 and is normally open. When pyroelectric detector 10 is attached to the optical sampling apparatus to be described, magnetic reed switch 20 closes and acts to operate circuitry in the read-out electronics which calculates and displays the power of the continuous wave light beam as will be explained fully hereinafter.

In any event, in the usual operation of pyroelectric detecting apparatus, the current output by component 14 is converted to an energy reading by circuitry 24 and delivered to the read-out display 26 via cord 28. Read-out display 26 is calibrated to display the result in terms of the basic energy unit of joules.

As aforementioned, energy is generally the quantity of interest when measuring a pulsed light source. Conversely, when measuring a continuous wave ("CW") light source, power is generally the quantity of interest. To use the same pyroelectric detector 10 as a power meter, it may be quickly and easily attached to optical chopping apparatus which effectively divides or "chops" the CW light source into pulses of light of which the energy is measured by pyroelectric detector 10. Means are provided to inform the processor circuitry within the read-out display 26 to calculate and display the power of the CW light based upon the energy reading of the pyroelectric detector of the chopped or pulsed light received.

Referring to FIGS. 4-9, the optical chopping apparatus, used in combination with pyroelectric detector 10 when the power of a CW light source is desired, is referenced generally by the numeral 30. Apparatus 30 comprises an outer housing 32 having a planar bottom panel 34, top panel 36 including rearwardly extending handle 38 for grasping and carrying housing 32, opposite side panels 39 and 40, back panel 42 and four inwardly oriented front panels 44 defining a substantially centrally located orifice 46 through which CW light passes to impinge upon elements internal to the housing.

A heat sink is provided in the form of spaced, parallel ribs 48 vertically extending from a ledge 50 projecting forwardly from the top edge of the upper-most front panel 44. Housing 32, including ribs 48, is preferably formed as an aluminum casting although any metal alloy having quick heat dissipation properties would be sufficient.

As seen best in FIGS. 5 and 8, a portal 52 is formed and configured at the back panel 42 of housing 32 for insertion of the nose 12 and the top half of main body portion 18 of pyroelectric detector 10. More specifically, a first half of the portal 52 is defined by back panel edge 54 and an inner wall 56 which extends inwardly to form an internal arch of substantially the same dimensions as the outer, curved surface of main body portion 18. When detector 10 is inserted into portal 52 as seen in FIG. 8, the curved surface of portion 18 is in abutting contact with the internal surface of the arched wall 56.

A second half of portal 52 is formed by a second wall 58 which defines a circular opening 60 of substantially the same diameter as the outer diameter of nose 12.

Hence, when pyroelectric detector 10 is inserted into portal 52, the outer surface of nose 12 is in abutting contact with the inside surface of circular opening 60. Also, as seen in FIG. 8, the front surface 62 of detector 10, which extends between the curved surface of main body portion 18 and nose 12, is in abutting contact with wall 58.

A spring loaded detent 64 is positioned within wall 58 and engages groove 16 in nose 12 to secure pyroelectric detector 10 in portal 52 when the former is positioned within the latter.

Referring now to the internal elements of housing 32 and operation of the optical chopping apparatus positioned therein, an electric motor 66 is mounted for operation within housing 32 by means of mounting bracket 68 which is anchored to housing side wall 39. Motor 66 is positioned diagonally within housing 30 and drives a shaft 70 which rotates optical chopping disc 72 (FIG. 6). As seen in FIG. 8, chopping disc 72 is positioned at an approximately 30 degree angle to the incoming CW light beam which passes through orifice 46 to impinge upon disc 72. Chopping disc 72 is formed of aluminum and is polished such that at least surface 78 on which the CW light impinges is highly reflective.

A pair of V-shaped slots 74 and 76 are formed opposite each other in disc 72 and are termed "2% slots" since they allow only 2% of the CW light to pass as disc 72 is rotated by motor 66. The remaining 98% of the CW light is deflected by the reflective surface 78 of disc 72 and directed to impinge upon internal housing wall 80 which is seen in FIG. 8 to extend in a direction normal to disc surface 78 to form a fork with upper front wall 44. The heat of the CW light striking wall 80 is dissipated along ledge 50 and ribs 48 and into the air.

As previously stated, motor 66 is set to rotate disc 72 at 900 RPM or 15 RPS which provides that 30 events (i.e., pulses of light) per second will pass through disc 72 to impinge upon detector 10. To ensure that disc 72 rotates at a constant rate, an LED and LED detector (not shown) are positioned on opposite sides of disc 72 adjacent holes 82 which are equally spaced around the perimeter of disc 72 (FIG. 6). As disc 72 rotates, the holes 82 are "counted" by the LED and LED detector and the resultant value is compared to the elapsed time on a crystal clock (also not shown). If the LED counted value is not in phase with the crystal clock value, an error signal is given to an amplifier in motor 66 which adjusts its speed of rotation accordingly.

Referring now to FIG. 10, pyroelectric detector 10 is used individually when measuring the energy of a pulsed light source 84. Pyroelectric detector 10 is positioned and aligned to receive the pulsed light from source 84 in the manner aforementioned. Magnetic reed switch 20 is in the open position and pyroelectric detector 10 therefore operates as an energy meter in the normal manner of pyroelectric detecting apparatus. Simply stated, an electric current is developed in response to the rate of change of the temperature of the optical collecting component 14 in detector 10. The resulting step amplitude is electrically integrated by integrating circuit 24. The processor circuitry within read-out display 26 digitizes this wave form in real time, measures and computes the amplitude of this pulse, displaying the result in terms of joules, as is known in the art.

Figure 11:
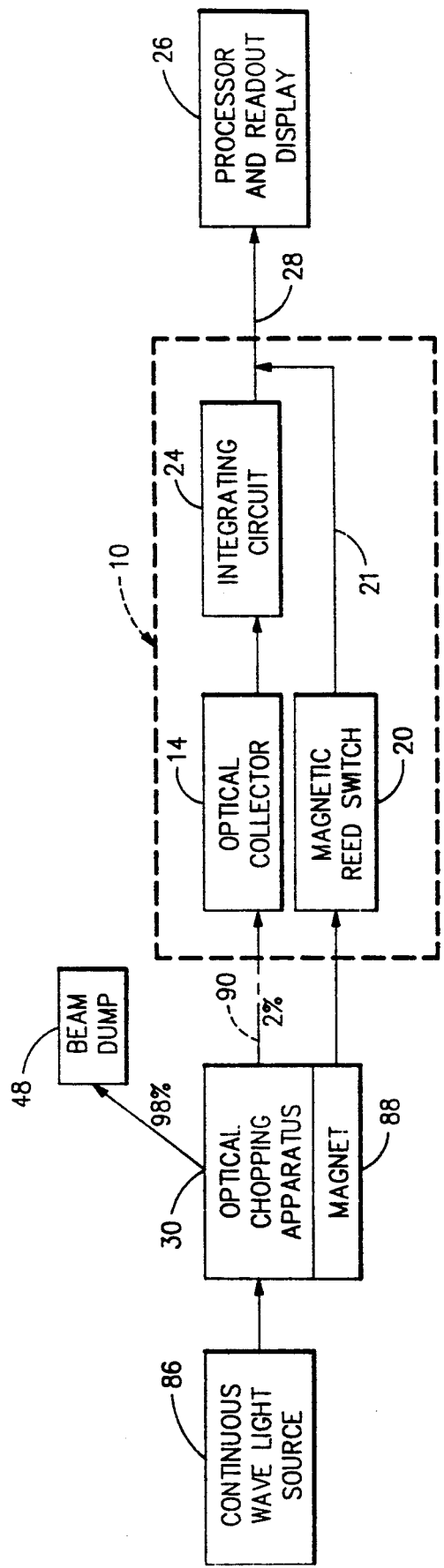
FIG. 11 is a block diagram illustrating the basic operation of the radiometer comprising the combination of the pyroelectric detector and the optical sampling apparatus as it is used to measure the power of a continuous wave light source.

Referring to FIG. 11, pyroelectric detector 10 is attached to the back of optical chopping apparatus 30 in the manner heretofore described and as seen in FIG. 8 to measure the power of the CW light source 86. A magnet 88 located in back wall 42 of housing 32 (FIG. 5) is positioned to close magnetic reed switch 20 upon placement of detector 10 into portal 52 of housing 32. The closing of switch 20 provides a logic input (at reference numeral 21 in FIG. 11) rendering the power-measuring circuitry of processor 26 operative to calculate the power of the CW light source. In the present invention, power of the CW light is assumed to be constant for the duration of the exposure time which is set at 667 micro-seconds by the crystal clock. The power of the CW light is therefore calculated by dividing the energy by the exposure time of the CW light source 86 upon chopping disc 72 wherein the energy is measured by detector 10 and the exposure time is fixed at 667 micro-seconds by the crystal clock (not shown). The power-measuring circuitry calculates the result and the display is given in terms of watts.

It may therefore be realized that an efficient power meter is hereby provided in the form of an energy measuring pyroelectric detector in combination with optical chopping apparatus. The present invention is not only versatile in that a single pyroelectric detector can be used for both energy and power measurements, but also easily and quickly operable by attaching the detector housing to and removing it from the optical chopping apparatus as desired, requiring no manual changing of components or circuitry to convert from a power meter to an energy meter and vice versa. The same read-out display 26 provides readings in either watts or joules depending on whether or not detector 10 is attached to optical sampling apparatus 30. The closing of magnetic reed switch 20, which occurs when detector 10 is attached to housing 32, automatically and immediately actuates the processor in the read-out electronics to calculate and display the power of the CW light source. Furthermore, since only 2% of the CW light passes through chopping disc 72 to strike and heat detector 10, detector 10 can withstand a much higher peak power density than is true of conventional thermo-pile based power meters.

While the present invention has been described in detail for the preferred form shown, it will be understood that modifications may be made within the scope of the invention as defined by the claims which follow.

What is claimed is:

1. Radiometer apparatus for alternatively measuring either energy of light from a pulsed source or power of light from a continuous wave source, said apparatus comprising:
   a) a pyroelectric detector having a light-receiving surface adapted to generate an electrical signal commensurate with the energy of light impinging upon said surface;
   b) optical chopping means adapted to pulse and reduce by a predetermined amount the quantity of continuous wave light directed along a path intercepted by said chopping means;
   c) means for removably positioning said pyroelectric detector and said optical chopping means in a predetermined, relative orientation with said continuous wave light, as pulsed and reduced by said chopping means, directed to impinge upon said surface;
   d) circuit means receiving said electrical signal as an input and operable in a first state to provide an output commensurate with the optical energy of said light impinging upon said detector surface, and in a second state to provide an output commensurate with the power of said light impinging upon said detector surface; and e) actuating means operable to automatically place said circuit means in said second state in response to positioning said pyroelectric detector and said chopping means in said predetermined orientation.

2. The radiometer apparatus of claim 1 wherein said chopping means is a rotatable disc including at least one radially extending slot extending therethrough.

3. The radiometer apparatus of claim 1 wherein said pyroelectric detector and said chopping means are respectively mounted in first and second, mutually distinct housing means.

4. The radiometer apparatus of claim 3 wherein said positioning means comprise means for releasably attaching said first and second housing means to one another.

5. The radiometer apparatus of claim 4 wherein said releasable attaching means comprise cooperably formed portions of said first and second housing means.

6. The radiometer apparatus of claim 1 wherein said actuating means comprises a switch movable between open and closed positions in response to placing said pyroelectric detector and said chopping means out of and into said predetermined orientation, respectively.

7. The radiometer apparatus of claim 6 wherein said switch is a magnetically actuated switch mounted in fixed relation to one of said pyroelectric detector and said chopping means, and further comprising a magnet mounted in fixed relation to the other of said pyroelectric detector and said chopping means, said magnet and switch being positioned in actuating proximity when said pyroelectric detector and said chopping means are in said predetermined orientation.

8. The radiometer apparatus of claim 7 and further including first and second housing means, wherein said pyroelectric detector and said chopping means are respectively mounted, and wherein said switch and magnet are respectively mounted in said first and second housing means.

9. The radiometer apparatus of claim 6 wherein movement of said switch between said open and closed positions operates to provide alternate, first and second logic inputs to said circuit means causing said circuit means to alternately operate in said first and said second states, respectively.

10. The radiometer apparatus of claim 1 and further including display means connected to receive said output of said circuit means and to generate a perceptible indication of the value of said optical energy of said light impinging upon said surface when said circuit means is operable in said first state, and of the value of power of said light impinging upon said surface when said circuit means is operable in said second state.

11. The radiometer apparatus of claim 10 wherein said perceptible indication is a visual, digital display.

12. Apparatus for the selective measurement of the energy of a pulsed light source or the power of a continuous wave light source, comprising:

a) a pyroelectric detector adapted to measure the energy of optical radiation incident thereon;

b) means to chop a continuous wave light into a repetitive series of pulses of light at a predetermined rate;

c) means to selectively position said detector in operational engagement with said chopping means, said detector receiving and measuring the optical energy of said pulses of light passing through said chopping means when in said position;

d) means to calculate the power of said continuous wave light when said detector means is in said operational engagement with said chopping means;

e) means for alternately providing a receptible indication of either of said energy of said pulsed light or said power of said continuous wave light; and f) means automatically actuating said power calculation means and said indication means to calculate and indicate said power of said continuous wave light when said detector is placed in said operational engagement with said chopping means.

13. The invention according to claim 12 wherein said chopping means comprises a disc having first and second, opposing planar surfaces including at least one slot of predetermined dimension and size extending through said disc from said first surface to said second surface.

14. The invention according to claim 13 wherein said chopping means includes means to rotate said disc whereby, when said continuous wave light is directed to impinge upon said first surface, rotation of said disc allows portions of said continuous wave light to pass through said at least one slot, thereby creating said repetitive series of pulses of light at said predetermined rate.

15. The invention according to claim 14 wherein said disc first surface is light reflective, and further including a heat sink positioned in relation to said disc such that said continuous wave light which strikes said disc first surface is reflected and directed to said heat sink.

16. The invention according to claim 12 wherein said positioning means comprises a housing having an internal cavity adapted to contain said chopping means, said housing including a front wall having an orifice for passage of said continuous wave light therethrough to impinge upon said chopping means, said housing further including a back wall having an open portal communicating with said internal cavity and configured such that said detector means may be releasably positioned therein to receive and measure the energy of said series of pulses of light passing through said chopping means.

17. The invention according to claim 16 wherein said actuating means comprises a magnet positioned within said housing adjacent said portal and a magnetic reed switch positioned in said detector whereby said magnetic reed switch is closed by said magnet when said detector is positioned within said portal.

* * * * *